US006670015B1

(12) United States Patent
Hanson

(10) Patent No.: US 6,670,015 B1
(45) Date of Patent: Dec. 30, 2003

(54) RESTICKABLE AND REMOVABLE LABEL TECHNOLOGY LABELS

(75) Inventor: Derek W Hanson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/569,700

(22) Filed: May 11, 2000

(51) Int. Cl.[7] ............................ B32B 3/02; B32B 15/04
(52) U.S. Cl. ..................... 428/64.4; 428/64.1; 428/64.6
(58) Field of Search ............................... 428/64.4, 64.1, 428/64.6, 343

(56) References Cited

U.S. PATENT DOCUMENTS 5,543,001 A 8/1996 Casillo et al. ................ 156/60
5,825,292 A * 10/1998 Tsai et al. ................... 340/572

FOREIGN PATENT DOCUMENTS

| | | | |
|---|---|---|---|
| DE | 29610644 U | 6/1996 | ............. G09F/3/02 |
| EP | 0855713 A1 | 1/1998 | ........... G11B/23/40 |
| WO | WO97/44787 | 11/1997 | ........... G11B/23/40 |

OTHER PUBLICATIONS

Eurpoean Search Report, dated Aug. 27, 2001 (EP01102680).

* cited by examiner

*Primary Examiner*—Cynthia H. Kelly
*Assistant Examiner*—L. Ferguson

(57) ABSTRACT

The present invention pertains to an article of manufacture of restickable and replaceable label technology, particularly for use as replaceable and restickable labels for digital medium discs. In a preferred embodiment, a label is disclosed that comprises an adhesive that permits such label to be securely applied to a digital medium disc in a manner that such label does not disrupt the functionality of such disc. Further, the adhesive permits such label to be removed from the digital medium disc without damaging or disrupting the functionality of such disc. Further still, the adhesive permits such label to be reapplied to a digital medium disc. In a preferred embodiment, a circular label is disclosed that comprises an aperture in the center of such label for aligning the label correctly on a digital medium disc to ensure that the label does not disrupt the operation of such disc after the label has been properly applied. In alternative embodiments, the disclosed label technology may be utilized for articles of manufacture other than labels for digital medium discs.

16 Claims, 1 Drawing Sheet

RESTICKABLE AND REMOVABLE LABEL TECHNOLOGY LABELS

TECHNICAL FIELD

This invention relates in general to an article of manufacture for removable and restickable label technology, and in specific to a removable and restickable label for use with an optical disc.

BACKGROUND

Prior art label technology typically involves a label for application which has a permanent adhesive. Thus, the prior art labels cannot easily be removed, and as such, will leave ripped or shredded remains, as well as adhesive residue. This is particularly problematic when the labels are being used to identify the changeable contents of the object upon which they are placed, wherein the labels must be revised or rewritten to reflect a change in notation regarding the identified object. Also, the permanent adhesive can cause problems during the initial placement of labels, as misapplied labels cannot be removed and thus the label remains in a crooked or misaligned manner.

In particular, use of the prior art labels as applied to optical discs, such as compact discs (CDs), Digital Video Discs (DVDs), as well as rewriteable or recordable discs, leads to undesirable situations. Such undesirable situations often arise where a label is applied to the center of a CD or DVD as an identification tag, but not in a perfectly aligned or centered manner. Such placement can lead to off balanced spinning of the discs around the mechanical center, misreading of an inadvertently covered or damaged readable substrate, and failure in the actual loading of discs into a reader when misapplied and/or multiple applications of labels which lead to raised levels above the surface tolerance levels of the disc reader.

At present, no suitable labels are utilized on such optical discs to overcome such disadvantages. By way of example, even a potential application of prior art restickable and removable technology, such as that exemplified by the product Post-It Notes™ would not obviate the aforementioned disadvantages, because the adhesive used in the prior art is only applied to a portion of the label, thereby leaving a portion to lift, protrude and generally interfere with the spinning of a DVD or CD. Furthermore, even if one were to apply such an adhesive to the whole side of a given label, the label has a potential to inadvertently come off a target surface, such as a DVD or CD, if an adhesive that is too weak (or not "sticky" enough) is used. The result of this would be to interfere with rotation and, in particular, would throw a spinning CD or DVD off balance if not adapted as a perfectly circular and centered shape. By the same token, if an adhesive is utilized that is too strong (or too "sticky"), as is common with prior art optical disc labels, such label may not be easily removed to be replaced or realigned without tearing and/or damaging the surface of the optical disc, thus potentially rendering data on the optical disc unreadable.

SUMMARY OF THE INVENTION

In view of the above, there exists a desire for a label having an adhesive that permits such label to be applied to a surface, removed, and reapplied without tearing, shredding, or leaving adhesive residue behind. There exists a further desire for a label that is capable of being utilized on CDs, DVDs, other optical discs, or other types of digital medium discs without damaging such discs or disrupting the operation of such discs.

These and other objects, features and technical advantages are achieved by an article of manufacture which is based on a restickable and removable label technology and which corrects the problems of the prior art regarding data loss stemming from degradation of reflective coatings of discs etc., as well as mechanical problems arising from incorrectly applied labels, off balance conditions, and every day convenience problems relating to the updating of information on labels and the substitution or reuse thereof.

In a preferred embodiment, a label technology is disclosed wherein a label comprises an adhesive that permits such label to be securely attached to a surface and also permits such label to be removed and reapplied securely to a surface. In a preferred embodiment, such label technology is implemented to be utilized on digital medium discs, such as optical discs (e.g., CDs or DVDs). Such a label technology comprises a circular label having a circular aperture in the center of such label for aligning the label correctly on a digital medium disc. The label technology further comprises an adhesive that permits such label to be securely attached to a digital medium disc, such that the label does not disrupt the operation of the disc. The adhesive also permits such label to be removed from the digital medium disc without damaging such disc. That is, the label may be removed from a digital medium disc without shredding, leaving behind adhesive residue, or otherwise damaging the disc.

The adhesive further permits such a removed label to be reapplied to a digital medium disc securely. Accordingly, if a user initially misapplies the label (e.g., places the label off center on the disc), the user may remove and reapply such label. Additionally, if data stored on a disc changes, the user may remove and replace the label on such disc with a label describing the new contents of the disc.

It should be appreciated that a technical advantage of one aspect of the present invention is that an article of manufacture based on a restickable and removable label technology is disclosed. A further technical advantage of one aspect of the present invention is that a label technology is disclosed wherein a label is applied securely to a digital medium disc without disrupting the functionality of such disc. Still a further technical advantage of one aspect of the present invention is that a label technology is disclosed wherein a label may be removed from a digital medium disc without damaging or disrupting the functionality of the disc. Yet a further technical advantage of one aspect of the present invention is that a label technology is disclosed wherein a label may be securely applied to a digital medium disc, removed therefrom, and reapplied to a digital medium disc without damaging or disrupting the functionality of the disc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
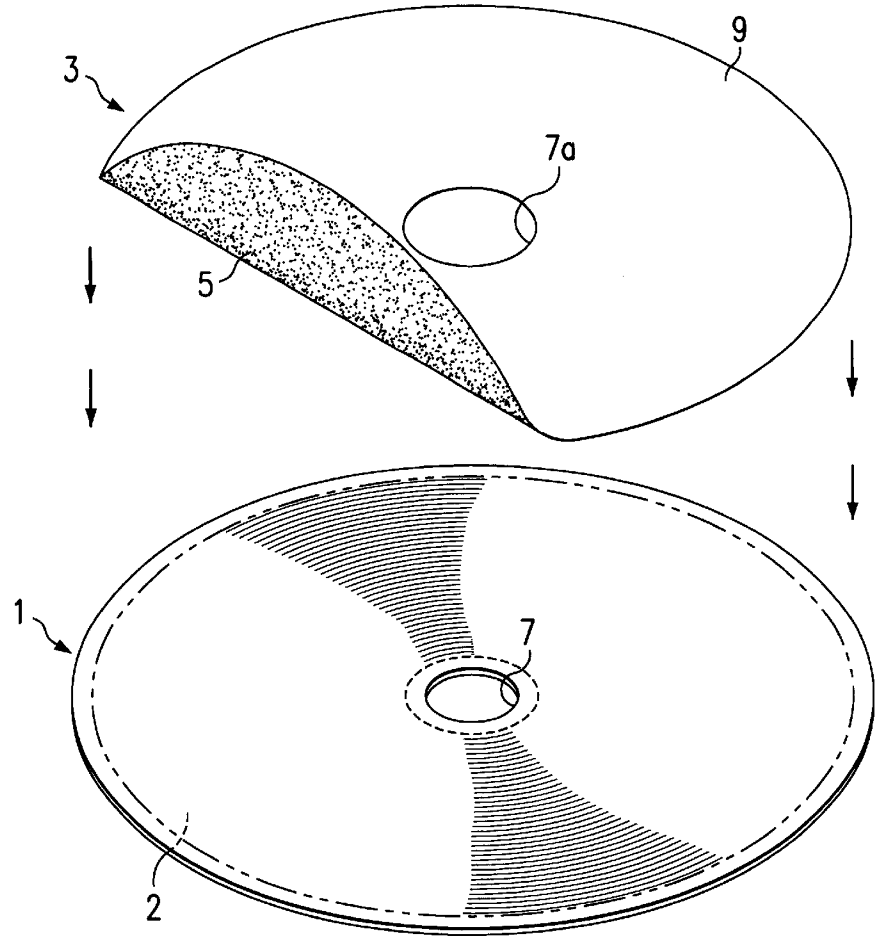
FIG. 1 is a top elevational view of a digital medium disc disengaged from a label of the present invention.
Figure 2:
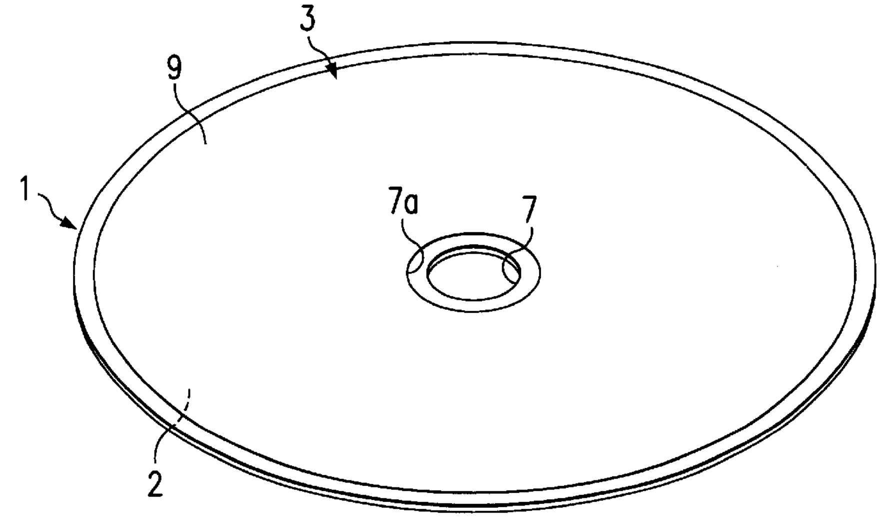
FIG. 2 is a top elevational view of a digital medium disc engaged with a label of the present invention.

Shown in FIG. 1 is an exemplary object 1 to which a restickable and removable label 3 would be applied. By way of example, in a preferred embodiment, the object would be a digital medium disc 1, which in an especially preferred embodiment, would be a CD disc or DVD disc. FIG. 1 illustrates a preferred embodiment of the removable and restickable label technology 3, shown as disengaged from the surface 2 of digital medium disc 1.

Preferably, such restickable and removable label technology 3 has a circular cut out 7*a* (i.e., hole or aperture), which is sized so as to concentrically surround situating aperture 7 of digital medium disc 1. The restickable and removable label technology 3 is engaged, applied or "stuck" on to the digital medium disc 1 with hole 7*a* being aligned with aperture 7 of digital medium disc 1.

The engagement of the object surface is effectuated by adhesive 5 which, as explained above, is provided in such a way as to permit the removable and restickable label technology 3 to be easily removed from and reapplied to digital medium disc 1 as necessary. This adhesive is applied to a medium surface 9 which is preferably paper, but may also be made out of alternative materials such as Mylar™, cellophane, etc. Adhesive 5 may be any suitable type of adhesive now known or later developed. Most preferably, such adhesive has an appropriate tackiness to enable the medium 9 to adhere to the surface 2 of disc 1 during operation of a read and/or write device on disc 1, while also enabling the medium 9 to be removed from surface 2 relatively easily. Accordingly, the "strength" (or tackiness) of the adhesive 5 may be based on the type of medium 9 used. For example, adhesive 5 may be implemented such that its strength is appropriate in relation to the strength of the medium 9 with which it is used. For instance, if medium 9 is a relatively thin sheet of paper that would tend to tear easily when a user attempts to remove medium 9 from surface 2, then adhesive 5 may be a relatively "weak" adhesive to enable the medium 9 to be removed by a user without the medium 9 tearing. However, adhesive 5 should be strong enough to enable the medium 9 to adhere to surface 2 without inadvertently coming detached from such surface 2. For example, adhesive 5 should be strong enough to enable the medium 9 to remain adhered to surface 2 during operation of a drive reading data from and/or writing data to disc 1.

Consequently, should a user inadvertently engage or stick restickable and removable label technology 3 off center from the center as determined by situating aperture 7, the user would remove the label, re-align or reposition the label, and re-engage the label onto disc 1. The user would detect the misalignment from the provision of circular cut out 7*a* which is visibly contrasted against the situating aperture 7. Adhesive 5 applied, on medium surface 5 has the right balance of tackiness and viscosity, which will permit the restickable and removable label technology 3 to be readily removed from digital medium disc 1, and reapplied as necessary. This prevents the disruptive effects of having an unevenly balanced disc spinning, which can be caused by application of off center labels on digital medium discs. Most preferably, adhesive 5 does not compromise the reflectivity of a digital medium disc upon the label 3 being removed from such digital medium disc. That is, the adhesive 5 most preferably is implemented to enable the label 3 to be removed from a digital medium disc without compromising the reflectivity of the digital medium disc, which could potentially destroy the readability of the digital data Nevertheless, the superior properties of the present invention as used on digital medium discs do not prevent or limit the invention from being used on other objects for identification purposes. Specifically, other embodiments of this invention are contemplated for use as labels on "floppy" computer disks, Zip™ drives, file cabinets, files, folders, containers for food, hardware supplies, lockers, boxes and all other manner of objects which might need identification as to contents contained therein (or other information), but optimally require a removable and/or restickable label system which is flexible enough to accommodate frequent information changes. In fact, the present invention further contemplates all manner of uses where a restickable and removable label would be needed without regard to informational needs. By way of example, the present invention can be easily modified to provide frivolous, but non-damaging labels or stickers for leisure or amusement purposes, such as children's stickers which might be manufactured in amusing shapes or colors for placement on otherwise vulnerable surface areas such as walls, furniture, doors, etc.

The invention thus contemplates many different cut out shapes, such as triangles, etc., or any other shape or appearance that might appeal to an end user. However, these shapes may be limited where the object for application is a disc, as the balance of a disc is very critical when it comes to reading that disc in a high-speed recorder. As mentioned, any kind of off-balance condition where a label improperly installed or a label without circular property would cause the disc to spin at a problematic rate. Accordingly, the most preferred embodiment for the purpose of CDs or DVDs is a circular shape. While the invention is intended to encompass labels of any size, for the preferred embodiment utilized for a standard CD ROM disc that is 120 millimeters in diameter, the preferred diameter of the label is approximately 117 millimeters. Additionally, in such a preferred embodiment, the label has a circular hole having a diameter ranging from approximately 37 to approximately 50 millimeters, but is most preferably 38 millimeters, punched into the exact center of such label. Provision of such dimension will permit a label to be applied to a disc such that it does not interfere with the spindle mechanism on a CD ROM.

Although a standard CD ROM disc is 120 millimeters in diameter, there exists a second size of a disc that is 80 millimeters in diameter, and accordingly, another preferred embodiment of this invention contemplates a variation on this label for an 80 millimeter disc. For such an 80 millimeter disc, the label dimension may vary from approximately 74 to approximately 78 millimeters in diameter, most preferably 75 millimeters, with the same ranges for the hole (i.e., most preferably 38 millimeters) punched exactly in the center of that circle. Such an embodiment would allow for a label to function properly on that style disc. Preferably, the smaller label would also be applicable to the larger CD. Given the mechanics of height requirements for insertion into, say, a CD ROM reader, the label 3 thickness needs to be between one to four sheets of standard white office paper, and most preferably, one sheet of paper. More specifically, the label 3 thickness is preferably within the range of approximately 0.0040 inches and 0.0060 inches, and most preferably is 0.0045 inches.

It should be recognized that in alternative embodiments a label as disclosed herein may have any size or shape, and any such embodiment is intended to be encompassed within the scope of the present invention. It should be further recognized that in alternative embodiments a label as disclosed herein may have a hole (or aperture) having any shape or size, and any such embodiment is intended to be encompassed within the scope of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An article of manufacture of label technology comprising:

a medium surface;

an adhesive compound applied to one side of said medium surface;

wherein said adhesive compound permits removal of entirety of said label technology directly from an application surface of a digital medium without compromising said application surface and yet permits said label technology to adhere directly to said application surface sufficiently to avoid unintended separation from said application surface.

2. The article of manufacture of claim 1 wherein said medium surface is of the type which is capable of bearing printing.

3. The article of manufacture of claim 2 wherein said label technology is cut and shaped so as to accommodate a mechanically balanced application of said label technology for a digital medium disc.

4. The article of manufacture of claim 2 wherein said label technology is cut and shaped so as to offer usage as a non-information oriented sticker.

5. The article of manufacture of claim 1 wherein said label has a circular shape.

6. The article of manufacture of claim 5 wherein said label has a diameter of approximately 117 millimeters.

7. The article of manufacture of claim 5 wherein said label has a diameter within the range of approximately 74 millimeters to approximately 78 millimeters.

8. The article of manufacture of claim 5 wherein said label has an aperture in its center.

9. The article of manufacture of claim 8 wherein said aperture is circular and has a diameter within the range of approximately 37 millimeters to approximately 50 millimeters.

10. The article of manufacture of claim 1 wherein said label has a thickness within the range of approximately 0.0040 inches and 0.0060 inches.

11. The article of manufacture of claim 1 wherein said application surface is the surface of a digital medium disc.

12. The article of manufacture of claim 11 wherein said digital medium disc is an optical disc selected from the group consisting of compact disc (CD), digital video disc (DVD), and laser disc.

13. The article of manufacture of claim 11 wherein said adhesive compound has sufficient tackiness to enable said label technology to remain coupled to said digital medium disc during a read or write operation of said digital medium disc.

14. The article of manufacture of claim 13 wherein said adhesive compound has a level of tackiness that permits removal of said label technology from said digital medium disc without compromising the reflective surface of said digital medium disc and without said label technology inadvertently tearing during such removal.

15. A digital medium disc comprising:

a removable label removably coupled directly to the surface of said digital medium disc in a manner such that said removable label adheres to said surface sufficiently to avoid unintended separation from said surface while also enabling said removable label to be removed from said surface without compromising said surface.

16. The digital medium disc of claim 15 wherein said removable label comprises an adhesive compound that enables said removable label to be removed from said surface without compromising said surface and enables said removable label to be reapplied to said surface after being removed therefrom.

* * * * *